Dec. 23, 1958  W. F. PETERSON ET AL  2,865,522
BOAT TRAILER
Filed Jan. 23, 1956  4 Sheets-Sheet 1
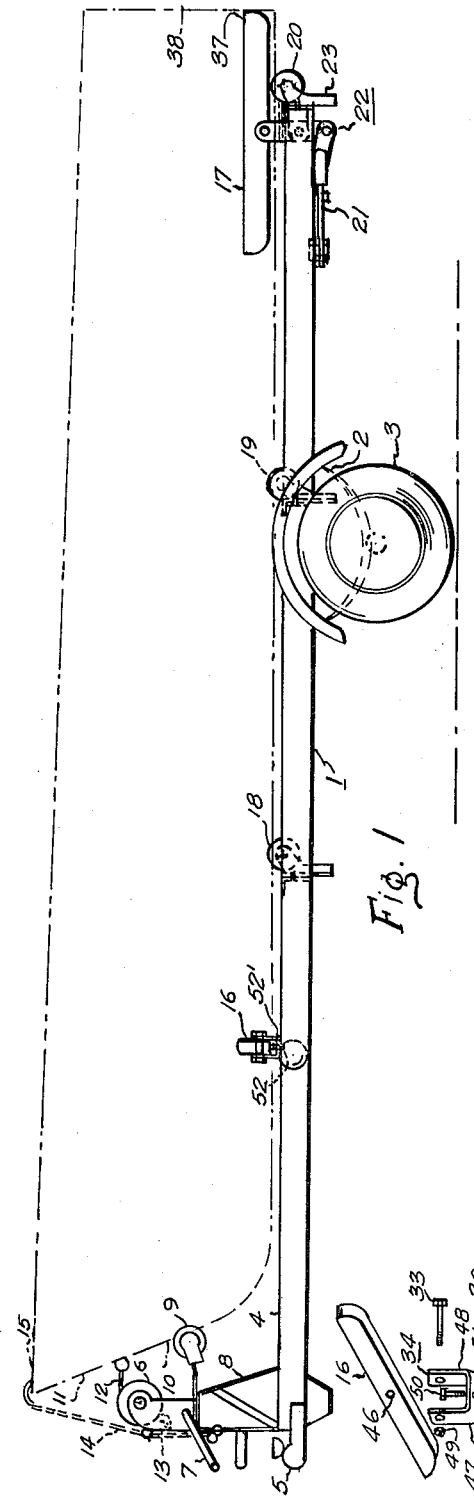
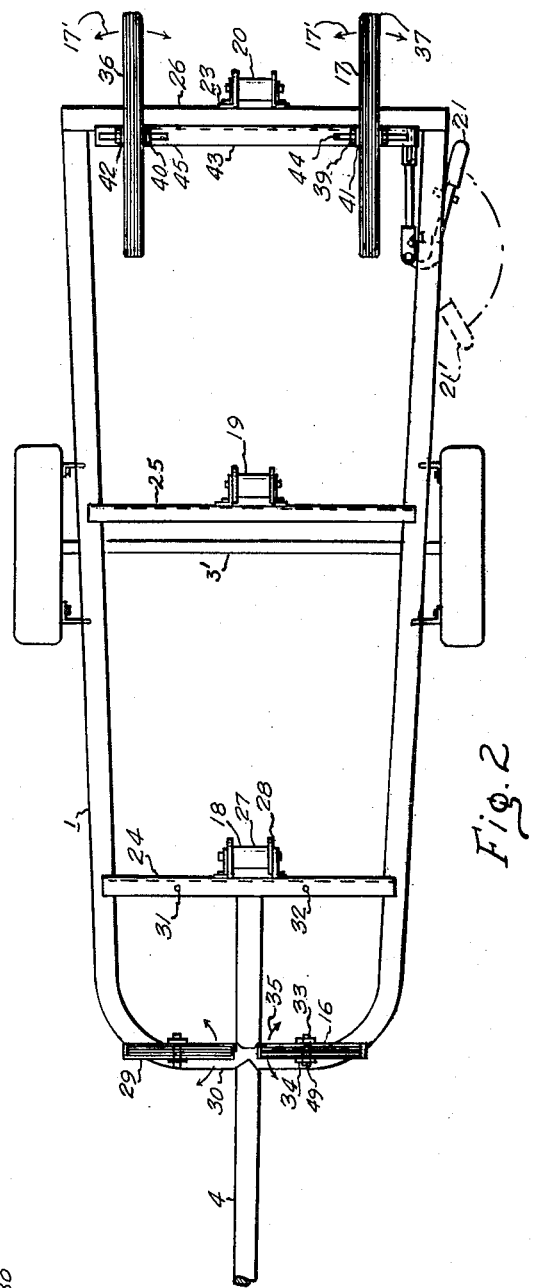
INVENTORS
Walter F. Peterson
BY  & Frank H Peterson
George H. Baldwin
ATTY.

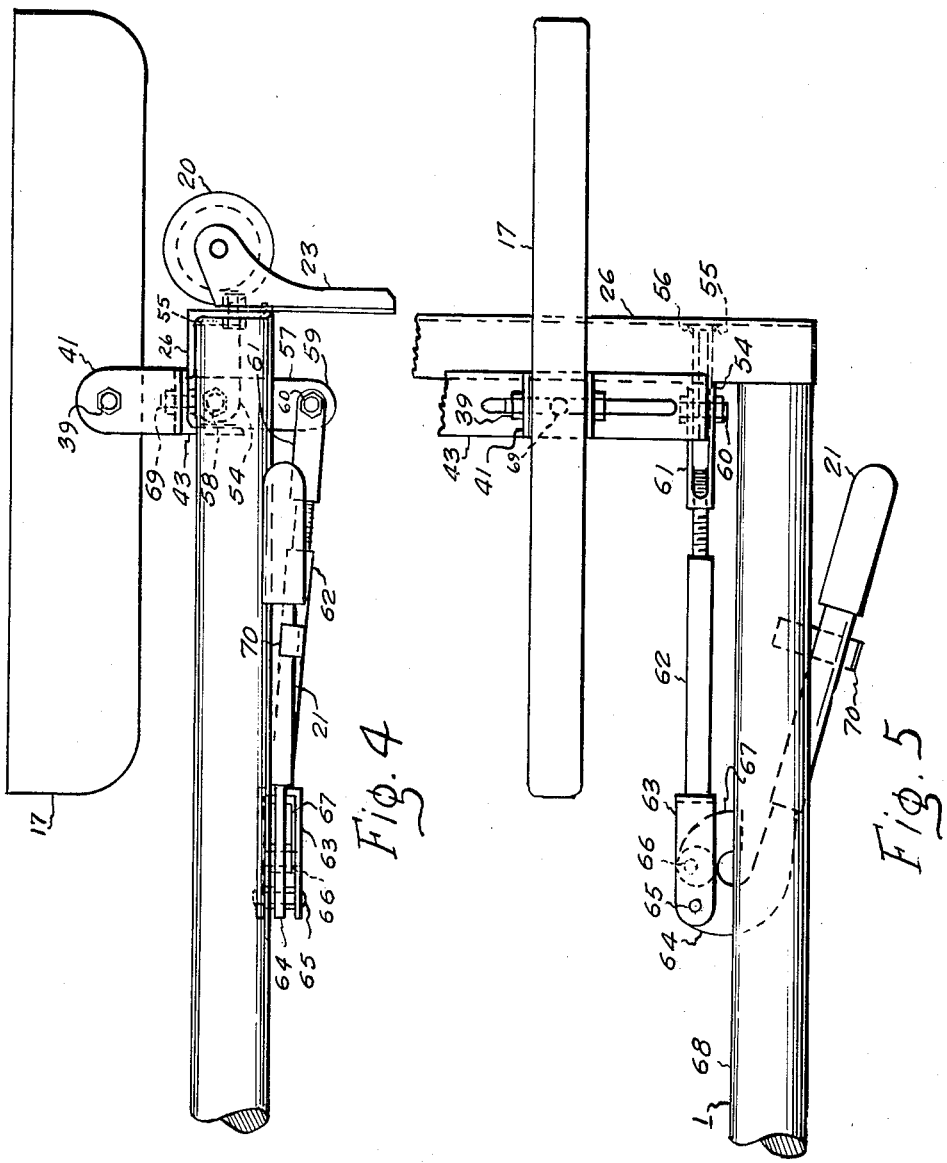

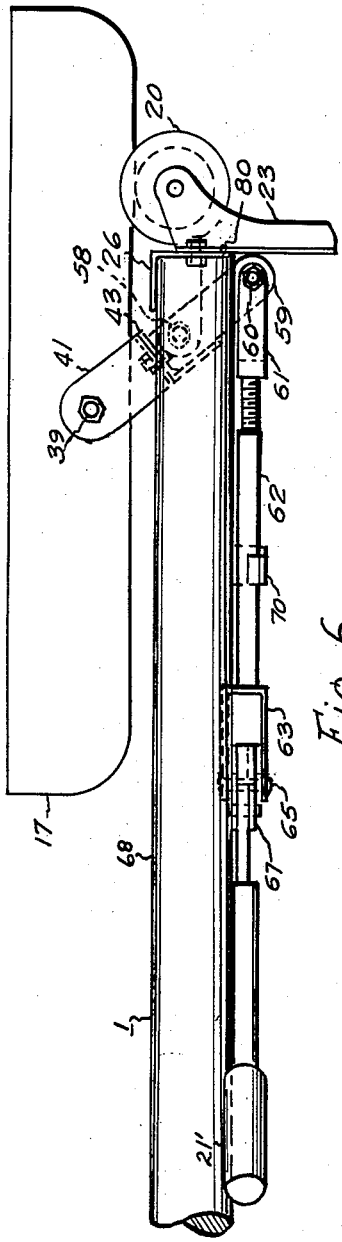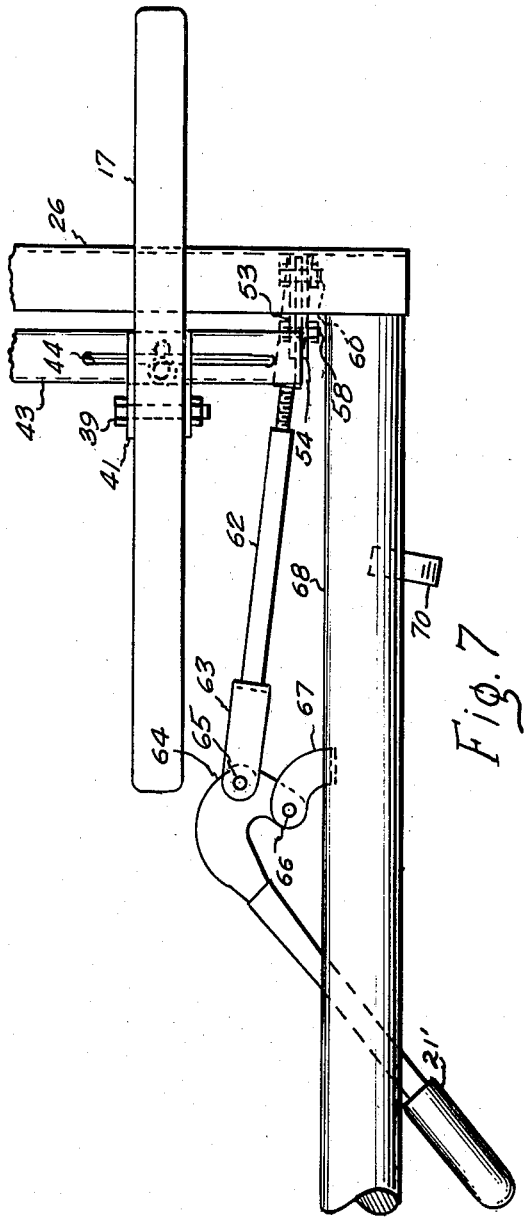

Dec. 23, 1958 W. F. PETERSON ET AL 2,865,522
BOAT TRAILER
Filed Jan. 23, 1956 4 Sheets-Sheet 4
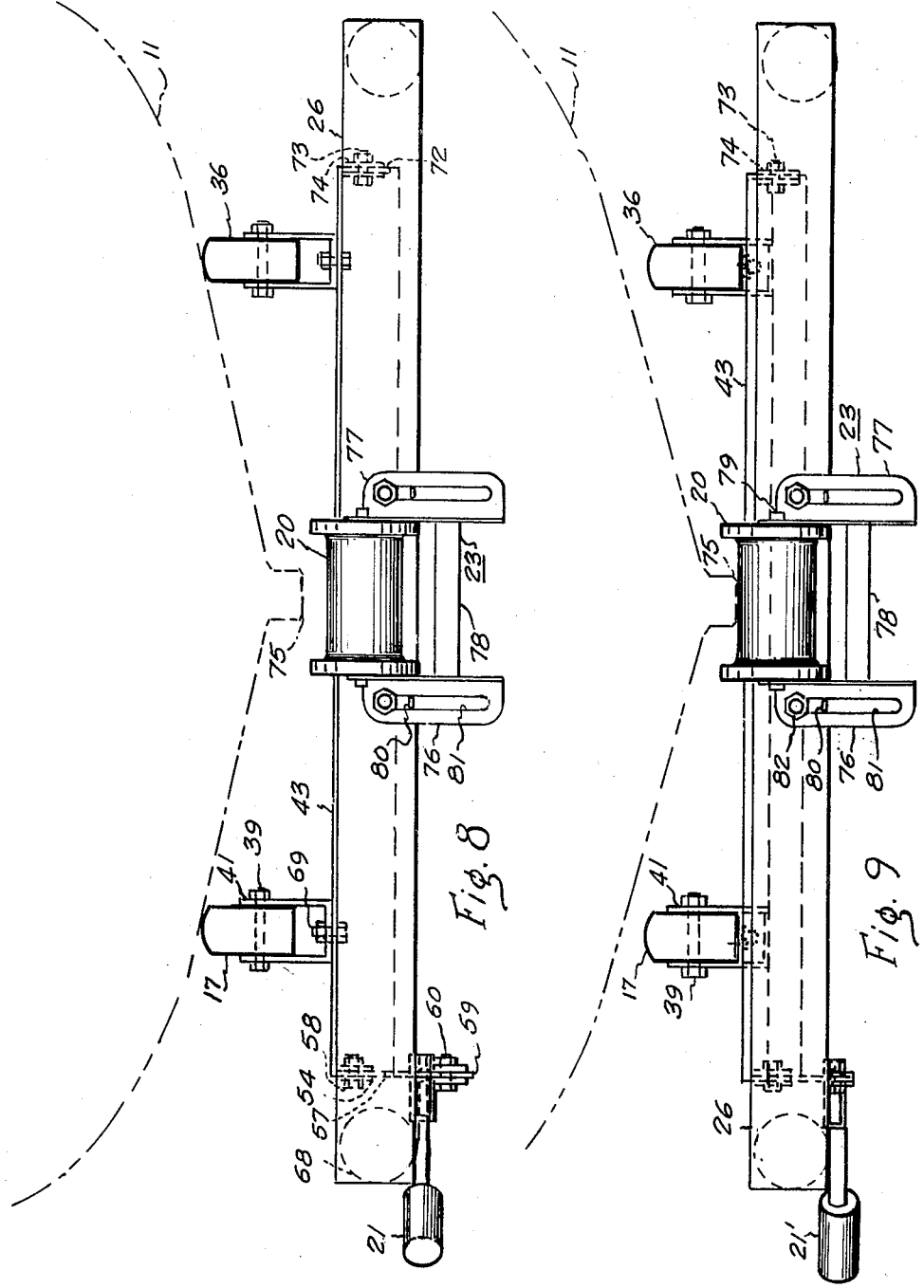
INVENTORS
Walter F. Peterson
BY & Frank H. Peterson
George H. Baldwin
ATTY.

United States Patent Office 2,865,522
Patented Dec. 23, 1958

2,865,522
BOAT TRAILER
Walter F. Peterson and Frank H. Peterson, Jacksonville, Fla.

Application January 23, 1956, Serial No. 560,491

7 Claims. (Cl. 214—84)

This invention pertains to boat loading and transporting devices, and more particularly to trailers having improved means for loading, unloading and carrying boats thereon.

A general object of the invention is to provide improved arrangements for the transportation of boats.

Specific objects of the invention are to provide improved boat cradling means, and to provide improved arrangements of boat cradling and traversing means, whereby a boat may be more easily loaded onto a trailer frame for transporting the boat, may be more easily unloaded from the frame, and will be more securely and safely held on the frame during transportation.

Further specific objects include the provision of a cradling arrangement for boat trailers and the like which will impose minimal stress on the boat structure and the provision of cradling arrangements adaptable partly automatically and partly by readily accomplished manual adjustments to boats of varying sizes and of a wide variety of hull configurations and designs.

It is also a general object of this invention to accomplish the specific improvements enumerated herein by means which provide a simple and light weight trailer, of ample strength, readily constructed and easily repaired, not subject to inadvertent damage, of good roadability, and of which the operation may be easily understood by novices unskilled in the transporting, launching and loading of boats.

Boat trailers according to this invention are adapted particularly to the carrying and loading and unloading of the larger sizes of outboard motor boats, including outboard cruisers, for example, although features of the invention are useful in trailers for even very small outboard motor boats and the like. The arrangement of cradles, rollers and other parts of the trailer shown herein is, furthermore, specifically adapted for use in connection with boats having auxiliary external keelsons or stabilizing fins along the sides of the hull bottom or other external protrusions or irregularities along the bottom, and the arrangement further adapts the trailer for use in connection with a wide variety of boats having configurations of the lower hull differing from conventional forms.

A specific feature of the invention is the provision of a supporting arrangement for a boat on a trailer which arrangement comprises anti-friction means, such as a plurality of rollers, disposed along the keel of the boat, and friction means, such as cradles, the friction means being raisable to provide support at distributed areas of the boat hull and to frictionally oppose shifting of the boat during transportation, and being lowerable to reduce the frictional forces, thereby to permit the boat to be moved off of the trailer on the anti-friction means.

A further specific feature of this invention is the provision in a boat trailer of means for supporting a boat over extensive areas which are so adjustable, both automatically and manually as to minimize strain of the boat structure.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 1 is a side elevation of a boat trailer in accord with this invention, including in broken lines the representation of a boat mounted thereon;

Fig. 2 is a top plan view of the major portion of the trailer from which the extreme forward end is broken away;

Fig. 3 is an exploded detail view, on enlarged scale, of a cradle assembly portion of the trailer;

Fig. 4 is an enlarged side elevation of an after portion of the trailer showing a stern cradle in raised position;

Fig. 5 is a plan view taken from above and corresponding to Fig. 4;

Fig. 6 is a side elevation similar to Fig. 4 but showing the cradle in lowered position;

Fig. 7 is a plan view taken from above and corresponding to Fig. 6;

Fig. 8 is a rear elevation taken on the scale of Figs. 4–7 showing stern cradles in raised position supporting a boat, represented in broken lines, in transporting position; and Fig. 9 is a similar rear elevation but showing the stern cradle in lowered position and the boat in position for loading or unloading.

With particular reference to Fig. 1, the illustrated embodiment of a trailer in accord with this invention comprises a frame 1 of tubing members welded together, leaf springs 2 supporting the frame on an undercarriage including wheel 3, and a forwardly extending tongue 4 having at its extreme forward end attachment means 5 to facilitate attachment of the trailer to the rear bumper, for example, of an automobile. A winch 6, having an operating handle 7, is mounted on a framework support 8, which, in turn, is affixed to tongue 4 immediately adjacent attachment means 5. Bumper 9, arranged for engagement by the bow 10 of the boat 11, is also attached to support 8, and the boat 11 may thus be pulled into position on the trailer by the reeling in of a bow line 12 until the bow 10 meets bumper 9, whereupon the winch is preferably locked by a locking device 13 to maintain line 12 taut, and additional hold-down lines 14 are attached between the bow portion 15 of the boat and the support 8.

The boat 11 is represented in position for transporting on the trailer with most or all of its weight being distributed between a pair of bow cradles, of which cradle 16 is visible, and a pair of stern or after cradles of which cradle 17 is visible. Anti-friction keel rollers 18, 19 and 20 are further shown in Fig. 1, and, as later further explained, these rollers support not more than a part and preferably only a very small part or none of the weight of the boat when in transporting position. The rollers are used, however, during loading and unloading or launching or the boat 11 on and from the trailer.

An operating handle or lever 21 is arranged in a mechanism 22 for raising and lowering the stern or after cradles, as hereinafter specifically described. The keel rollers are each mounted on a respective adjustable support, such as support 23, whereby the heights of the rollers may be individually fixed in the proper position for the boat with which the trailer is to be used. The roller positions, once determined, will not be changed except to adapt the trailer for a different boat design or size.

Fig. 2 shows the plan position of rollers 18, 19 and 20 disposed along the imaginary centerline of the frame 1 and carried by cross members 24, 25 and 26 respectively. The rollers are preferably formed of rubber and have a keel engaging surface 27 between increased diameter end flanges 28. Bow or forward cradles 16 and 29 are mounted on the generally transverse forward portion 30 of the frame 1 on opposite sides of the centerline for boats of approximately the length of the boat 11 as represented in Fig. 1, but for shorter boats, the forward cradles may be removed and mounted on cross member 24, mounting holes 31 and 32 being provided in member 24 for such purpose. Each of bow cradles 16 and 29 comprises an elongated padded member which is pivotally mounted on a generally horizontal pin or bolt 33 carried in a yoke 34, and the yoke, as later shown, is pivotally attached to the main frame member 30, or 24, for pivoting about a generally vertical axis. As so arranged, the cradle members may tilt about the axis of pin 33 to dispose one end of the cradle higher than the other, and each may swing as indicated by arrows 35 about its vertical pivot axis. The vertical and horizontal pivot axes for each cradle 16 and 29 are preferably located midway between the ends of the cradle, and normally, these cradles extend generally transversely of the trailer centerline.

Stern cradles 17 and 36 are normally disposed substantially parallel to the trailer centerline, as shown in Fig. 2, and the rearward ends of the stern cradles preferably underlie the transom of the boat being transported, as will be seen in Fig. 1 from the position of end 37 of cradle 17 underlying transom 38. Cradles 17 and 36 are pivoted, intermediate their respective ends, on generally horizontal pivot pins or bolts 39 and 40, carried, respectively, in yokes 41 and 42. The yokes, in turn, are pivotally mounted on a movable supporting bar member 43, spaced apart by a distance which may be adjusted because of the provision of slots 44 and 45 in bar 43.

Bar 43 is pivotally connected, as later shown, to the fixed stern cross bar 26, and is controlled by handle 21 to pivot from a position in which cradles 17 and 36 are raised to a position in which the cradles are lowered. The rearwardly extending full line position of handle 21 corresponds to raised cradle position, while swinging of arm 21 into the broken line, forwardly extending position 21' operates bar 43 into a position to lower the cradles.

Details of the mounting arrangement associated with bow cradle 16, duplicated in cradle 29, are shown in the exploded view of Fig. 3, wherein cradle member 16 is seen to have an opening 46 for disposition between apertured arms 47, 48 of yoke member 34 and through which horizontal pivot bolt 33 extends. Nut 49 threads on bolt 33. The yoke member is mounted to member or portion 30 of the trailer frame by a vertical bolt 50 which passes through opening 51 of the yoke and through a suitable opening in member 30, and receives nut 52 below ear 52'.

The detail of Fig. 3 is substantially applicable to the mounting of stern cradle 17 on yoke 41 by pivot bolt 39, and to the mounting of yoke 41 to bar 43 in a manner to permit the yoke to pivot about a vertical axis. Normally, the vertical pivot bolt 50 and its nut 52 are screwed tightly together to clamp yoke 34 to the extending horizontal ear 52' of the frame member 30 and to prevent swinging of the cradle member 16 about the vertical axis, but the bolt arrangement permits an original setting of the yoke position appropriate to the particular boat being transported and further permits any adjustments which may later be required. Each cradle is, however, during normal usage of the trailer, left free to pivot about its horizontal axes, such as the axis established by bolt 33, whereby the weight supported by the cradle is automatically distributed along the cradle, avoiding points of heavy stress on the boat hull, and whereby the weight of the boat during loading and unloading is more rapidly and smoothly transferred to and from the keel rollers.

Several factors are taken into account in determining whether the bow cradles should lie normal to the trailer centerline as shown or should be swung, as suggested by the arrows 35 in Fig. 2, into alignment with the centerline, and similar factors are involved in determining the best positions for stern cradles 17 and 36, which may be swung in the directions of arrows 17' to desired position, then to be locked in place. The shape of the hull and cradle positions should be so related that the boat weight transfers from cradles to rollers evenly and rapidly. The cradles should lie, in most instances, along generally flat outer portions of the boat hull and should provide external support under the greatest number of the strongest parts of the frame. For example, canting the stern cradles slightly may permit the forward ends to lie under specific strong ribs, or stringers, while the rear ends still underlie and support the transom. On the other hand, external skegs, keelsons or the like may require that the stern cradles be aligned as shown. If short boats are to be carried, the stern cradles may be swung around to extend perpendicularly of the centerline and thereby to avoid the danger of rearwardly overhanging members.

It is much to be desired that the center of gravity of the loaded boat be located above, or nearly above, the wheel axle 3', and the cradle arrangement herein disclosed is adapted to support any of a great variety of boats of various lengths and shapes in this desired relation to the axle.

Figs. 4, 5, 6 and 7 show details of the raising and lowering mechanism associated with the stern cradles, Figs. 4 and 5 showing the cradles raised and Figs. 6 and 7 showing the cradles lowered. One rear side corner only is shown for the sake of simplicity. The rear or after cross member 26 of the trailer frame is seen to be preferably an angle iron member, and a pair of lugs, such as left rear lugs 53 and 54, are connected as by welds 55 and 56 to extend forwardly from a portion of member 26. Lugs 53 and 54 form a fixed yoke in which a cradle bar lever 57 is pivotally carried by bolt or pin 58. Lever 57 is formed integrally with bar 43 and terminates downwardly in an apertured lower end portion 59 coupled by bolt 60 to clevis 61 of an operating rod 62. The forward end of rod 62 comprises a cam clevis 63 coupled to operating cam portion 64 of handle member 21 by means of pin 65. Generally longitudinal fore and aft motion is imparted to operating rod 62 by swinging of handle 21 between its forwardly extending position of Figs. 6 and 7 and its rearwardly extending position of Figs. 4 and 5, since, as most clearly shown in Fig. 7, a stationary pivot for the handle is established by pin 66 which extends through a pair of bosses 67 on side rail 68 of frame 1.

Stern cradle 17 is seen in Figs. 4–7, and in other figures of the drawings, throughout which like numerals are applied to designate the same part in the several views, to be mounted in yoke 41 for free pivoting about the generally horizontal axis of pin or bolt 39, the yoke being preferably rigidly but adjustably connected to bar 43 by means of bolt 69. Thus, as bar 43 is pivoted forwardly or in the counterclockwise direction from its position of Fig. 4, about its pivot axis on bolt or pin 58, into the position of Fig. 6, the pivot pin or bolt 39, being spaced from pivot 58 swings through an arc in a direction to lower bolt 39, and, with it, to lower cradle 17. The force necessary to rotate bar 43 about its pivot axis at 58 is applied at bolt or pin 60, which is also spaced from the axis of rotation of bar 43.

In pulling handle 21 outwardly and forwardly, it is first necessary to disengage the handle from a simple detent, catch or rest, such as is shown at 70, and then to pull the handle until rivet or pin 65 passes over center in its swing about stationary pivot 66. Over center action results from the positioning of rivet pin 66 slightly further inwardly from side rail 68 than is pin 65 when the handle is in the normal boat transporting position on catch 70.

The organization and operation of the stern cradles and associated mechanism are further seen in Figs. 8 and 9. Fig. 8 shows handle 21 in rearwardly extending position, with cradles 17 and 36 firmly engaging the hull of the boat, represented at 11, for transporting the boat, while Fig. 9 corresponds to the loading and unloading position of Figs. 6 and 7.

The stern or back view of Fig. 8 shows cradle 17 supported for pivoting in yoke 41 about the generally horizontal axis of bolt 39, and yoke 41 bolted by bolt 69 to cradle bar 43. The cradle bar 43 may have its ends formed and bent into a cradle bar lever 57 at one end and a shorter mounting lug 72 at the other end. Lug 72 is pivotally arranged on bolt 73, which, in turn, connects to cross frame member 26 through a pair of cradle bar yoke members 74 affixed to member 26. The assembly comprising lug 72 will be understood to correspond with the assembly associated with lever 57, with the exception that no handle 21 and linkage is employed with lug 72 and lug 72 may, therefore, be shorter than lever 57. The pivot axis for bar 43 is established through aligned bolts 58 and 73.

The boat keel, represented at 75 is shown in a position above roller 20, in Fig. 8, the distance being exaggerated to make more clear the comparison with Fig. 9, wherein cradles 17 and 36 have been dropped and the keel rests on roller 20.

It is not essential that the keel 75 lose contact with roller 20 when the cradles 17 and 36 are raised into the boat transporting position of Fig. 8, nor is it necessary that the cradles 17 and 36 drop completely out of contact with the boat hull when in lowered position. In practice, it has been found desirable to adjust roller 20, with the cradles raised, to be just in contact with the keel 75, carrying, perhaps, one hundredth to one twentieth of the boat weight imposed on cradles 17 and 36, under which conditions the friction of the cradles against the hull prevents the boat from shifting on the trailer. However, when the trailer passes over rough roads, the keel is prevented from sagging lower by contact with roller 20. It will be understood that boats are not completely rigid, and a reduction in "working" of the hull in the keel area results from the suggested roller position.

Fig. 9 similarly exaggerates the dropping away of the cradles. It is necessary only that most of the boat weight be shifted to the keel rollers. As the cradles are lowered, increased weight on roller 20, since the roller is preferably rubber, will dent or compress the roller slightly, and decreasing weight on the cradles may permit slight upward expansion thereof, for example, if the cradles are padded, and will cause some sagging of the now less supported sides of the hull. It is appropriate, accordingly, that the cradles drop only far enough to substantially eliminate the frictional drag on the boat hull.

In order that the rollers may be properly adjusted for the particular boat to be carried, each roller is mounted on a support 23 comprising a pair of slotted legs 76, 77, rigidly joined by a cross member 78 to preserve alignment, the roller being mounted on an axle 79 carried by the legs as shown. A small tab 80 is preferably partially cut from and turned outwardly from frame member 26 into slot 81 of leg 76 to assist in maintaining the leg vertical, and a similar tab arrangement is provided in connection with leg 77. Bolts and nuts, such as nut and bolt 82, are arranged to lock each leg of support 23 to frame cross brace 26 at the position in which roller 20 is at the correct adjusted height.

Each of keel rollers 18 and 19 shown in Figs. 1 and 2 is similarly adjusted to be in contact with the boat keel when the boat is in transportable position, roller 18 being supported on frame cross member 24 and roller 19 on frame cross member 25 by a respective adjustable height support similar to support 23 for roller 20. When the rollers are so adjusted, a minimum of bending stress is imposed on the boat keel while loading and unloading, as well as while transporting the boat. It will be apparent that, with the rollers all adjusted to meet the keel when the stern cradles are raised, lowering of the stern cradles eases the weight of the boat onto keel supports properly positioned to minimize stresses along the keel.

For launching, the after end of the keel is supported upon roller 20 and, because of the slight lowering of the stern of the boat upon dropping of the stern cradles, a substantial weight is now imposed on intermediate roller 19 and, furthermore, since bow or forward roller 18 is spaced aft of the bow cradles 16 and 29, the bow weight is partially transferred from the bow cradles to the bow roller. As the boat is now rolled a short distance in the aft direction, the bow cradles become completely free of boat weight and the boat rolls freely on the keel rollers. Since the boat is rolled aftwardly from the trailer, it is advantageous that the stern cradle mechanism tends to lower, rather than to raise, the stern of the boat.

In operation of the trailer to load, transport and unload or launch a boat, the hitch 5 and tongue 4 are raised to cause the frame to pivot on axle 3', thereby lowering the after end. The bow line 12 is attached to the boat and, with handle 21 in its forward position 21', winch 6 is operated to roll the boat on rollers 20, 19 and 18 until the hull becomes engaged on bow cradles 16 and 29 and the bow contacts bumper 9. Catch 13 is set to hold the winch against unreeling of line 12 and lines 14 are attached. The boat center of gravity being now over axle 3', the hitch 5 may be readily lowered and attached to the bumper of the automobile or other vehicle which is to pull the trailer. The stern cradles 17 and 36 are raised to take the weight of the stern of the boat and the boat is now arranged for transportation. Upon unloading, substantially the reverse operations are appropriate. The hitch 5 is disconnected and raised, the stern cradles are lowered, by bringing handle 21 forward, bow lines 14 are detached, catch 13 released and the boat rolls astern off of the trailer and, normally, directly into the water, being, meanwhile, supported along its keel by the keel rollers.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a boat trailer having an elongated frame and comprising keel-engaging anti-friction traverse means along the centerline of said frame, a cradle assembly comprising a generally horizontal elongated bar extending transversely of said frame, pivotal supporting means attaching said bar to said frame for pivoting about a predetermined axis generally parallel to the length of said bar, cradle support means having cradle supporting pivots spaced laterally from said axis, cradles pivotally supported on said supporting pivots, manually controlled means operatively connected to said bar and frame for pivoting said bar on said predetermined axis thereby to vary the heights of said cradle supporting pivots with respect to said frame, said manually controlled means comprising a link coupled to said bar at a point offset from said predetermined axis, an overcenter coupling assembly connected in force applying relation to said link, said assembly comprising a manually operable arm, and stop means for said arm.

2. In a boat trailer having a frame including an elongated horizontal rear cross brace, a keel roller, means attaching said roller to said brace to dispose the upper surface of said roller above said brace and establishing a rotationel axis for said roller parallel to said brace member, a pair of elongated stern cradle members spaced above said brace, extending substantially perpendicularly with respect to said cross brace and longitudinally of said frame, said cradle members having respective rearward end portions extending rearwardly of said roller and having respective medial portions substantially midway between their ends disposed forward of said roller, a respective generally horizontal pivot member supported from said frame and supportingly engaging said medial portion of each said cradle member and each said pivot member establishing a pivot axis approximately parallel to said brace for each said cradle member, and means for raising and lowering a portion of a boat on said trailer sufficiently to shift weight support alternatively between said roller and said cradles.

3. In a boat trailer having a frame including an elongated horizontal rear cross brace, a keel roller, means attaching said roller to said brace to dispose the upper surface of said roller above and to the rear of said brace, a pair of elongated stern cradle members spaced above said brace, extending substantially perpendicularly thereto, having rearward end portions extending rearwardly of said roller and having medial portions substantially midway between their ends disposed forward of said brace, a generally horizontal pivot member supported from said medial portion of each said cradle member and each said pivot member establishing a pivot axis approximately parallel to said brace for pivoting of each said cradle member thereon, and means for raising and lowering a portion of a boat on said trailer sufficiently to shift weight support alternatively between said roller and said cradles, said means comprising a manually operable support mechanism connected between said frame and said pivot members operable to raise and lower said pivot members and said thereby supported cradle members with respect to said cross brace.

4. A boat trailer comprising an elongated frame, at least three resilient keel rollers on said frame spaced along the centerline thereof and each having a rotational axis disposed transversely of said frame, a pair of bow cradles supported on said frame forwardly of said three keel rollers, a pair of stern cradles supported on said frame rearwardly of at least two of said three keel rollers, a movable support mechanism for said stern cradles supportingly connecting said stern cradles to said frame and selectively operable to raise said cradles into a boat transporting position and alternatively to lower said cradles into a boat unloading position, said rollers being positioned to be in substantially equal contact with the keel of a boat being transported when said stern cradles are raised into said boat transporting position and said contact being sufficiently light then to impose more than one half of the boat weight on said cradles, said stern cradles being sufficiently lowerable by said mechanism to impose more than one half of the boat weight on said rollers for facilitating unloading of the boat.

5. In a boat trailer having a cross brace frame member affixed at an end to a longitudinal side rail, an elongated slotted support member adjacent and substantially parallel to said brace member, hinge means having a hinge axis parallel to said brace member hingedly connecting said support member to said brace member, a pair of yoke members above said support member each having a pair of upstanding legs joined at the lower end by a base portion, adjustable attachment means comprising a threaded shank joined to and extending downwardly from the base portion of each said respective yoke member and through a slot in said support member and a respective nut on each said shank releasably tightened against said support member, a respective elongated cradle member having a medial portion disposed between the arms of each said yoke member, pivot means comprising a respective axle extending between said arms of each said yoke member and pivotally supporting the respective said cradle thereon, a lug attached to and extending laterally from said support member and disposed adjacent said side rail, elongated force applying means joined to said lug and extending along said side rail, an overcenter cam member pivotally attached to said side rail and having said force applying means joined thereto, and means joined to said cam member for pivoting said cam member with respect to said side rail.

6. In a boat trailer, a roller having an axle, a pair of coextensive, upstanding, parallel angle members having facing flanges spaced on opposite ends of said roller and mounting said axle, said members having respective second flanges lying in a predetermined plane, a strap member spaced from said roller attached between said angle members, each said second flange having an elongated, upright slot therethrough, a transverse frame member having an upright flat face portion engaging said second flanges, a pair of fixed tabs extending outwardly from said face portion and each engaged in a respective said slot, and respective adjustable attachment means for each said angle member extending guidingly through each said respective slot and spaced from the respective tab releasably anchoring the respective angle member against said face of said frame member, each said slot extending longitudinally through a greater distance than the distance between the corresponding tab and adjustment means whereby said roller is adjustable in height with respect to said transverse frame member.

7. A boat trailer comprising a frame having an imaginary centerline and an after end portion, a plurality of rotatable keel rollers along said centerline for rotation about respective axes fixed with respect to and extending transversely of said frame and including a stern keel roller at the extreme after end of said end portion, respective elongated cradle members disposed at said after end portion spaced on each side of and extending generally parallel to said centerline, generally horizontal pivots supporting said cradle members between their ends, said pivots having axes substantially parallel to said roller axes, and manually controllable means for mounting said pivots on said frame in positions spaced forwardly of said stern keel roller, said means being operable to lower said cradle sufficiently to engage the keel of a boat on said trailer supportingly on said rollers and selectively to engage liftingly along the sides of the bottom of the boat hull to take boat weight from said rollers, said cradles extending rearwardly from their respective said pivots and terminating rearwardly of the axis of said stern keel roller.

References Cited in the file of this patent

UNITED STATES PATENTS

| 2,558,418 | Brueckman | June 26, 1951 |
| 2,586,485 | Schroeder | Feb. 19, 1952 |
| 2,608,314 | Krider | Aug. 26, 1952 |
| 2,723,038 | Peterson et al. | Nov. 8, 1955 |
| 2,740,543 | Moundson et al. | Apr. 3, 1956 |
| 2,746,622 | Roy | May 22, 1956 |
| 2,766,897 | Alker | Oct. 16, 1956 |
| 2,805,786 | Green | Sept. 10, 1957 |

FOREIGN PATENTS

| 10,667 | Great Britain | May 6, 1912 |